United States Patent
Farr et al.

(10) Patent No.: US 7,083,337 B2
(45) Date of Patent: Aug. 1, 2006

(54) OPTICAL TRANSCEIVER PORT

(75) Inventors: Mina Farr, Palo Alto, CA (US); Jan Lipson, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 145 days.

(21) Appl. No.: 10/695,129

(22) Filed: Oct. 28, 2003

(65) Prior Publication Data

US 2004/0136723 A1    Jul. 15, 2004

Related U.S. Application Data

(60) Provisional application No. 60/422,331, filed on Oct. 30, 2002.

(51) Int. Cl.
*G02B 6/42* (2006.01)

(52) U.S. Cl. .................................................... 385/93

(58) Field of Classification Search ..................... None
See application file for complete search history.

(56) References Cited

U.S. PATENT DOCUMENTS

| 5,465,178 | A |   | 11/1995 | Nakai et al. |
| 5,515,469 | A | * | 5/1996  | Zarem et al. ................. 385/92 |
| 5,692,083 | A | * | 11/1997 | Bennett ....................... 385/88 |
| 6,243,508 | B1 | * | 6/2001 | Jewell et al. ................. 385/14 |
| 6,302,596 | B1 | * | 10/2001 | Cohen et al. ................. 385/93 |
| 6,612,719 | B1 |   | 9/2003 | Richardson et al. |
| 6,851,870 | B1 | * | 2/2005 | Deng et al. .................. 385/93 |
| 2001/0004414 | A1 | * | 6/2001 | Kuhn et al. .................. 385/93 |
| 2004/0264855 | A1 | * | 12/2004 | Chen ........................... 385/33 |

* cited by examiner

*Primary Examiner*—Rodney Bovernick
*Assistant Examiner*—Mike Stahl
(74) *Attorney, Agent, or Firm*—Workman Nydegger

(57) ABSTRACT

A port including a lens for coupling one optical element with another optical element. The lens includes a focusing lens surface that has optical power and a flat lens surface that has little or no optical power. The lens is typically aspherical and couples high angle rays emitted from a source and also introduces aberrations such that the image formed on the receiving optical element is not reflected back to the source optical element. A point is imaged as a spot. The port couples light between optical elements by slightly defocusing the source without impeding the efficiency of the port.

16 Claims, 5 Drawing Sheets

OPTICAL TRANSCEIVER PORT

CROSS-REFERENCE TO RELATED APPLICATIONS

This application claims the benefit of U.S. Provisional Application No. 60/422,331, filed Oct. 30, 2002 and entitled OPTICAL TRANSCEIVERS PORT, which is hereby incorporated by reference.

BACKGROUND OF THE INVENTION

1. The Field of the Invention

The present invention relates to optical transceivers. More particularly, the present invention relates to small form factor optical transceivers that couple light by defocusing the image in order to reduce or eliminate reflections back to the light source while still efficiently coupling the light.

2. Background and Relevant Art

Fiber optic networks often include a transmission side and a receiver side. On the transmission side, it is important that the light be efficiently coupled into the transmission fiber in order to achieve adequate transmission power with minimum laser output strength. On the receiver side, it is important to efficiently image the fiber output onto detectors with adequate margin for error. This is particularly true as the size of detectors decreases, often for cost reasons.

Effective coupling of the light into the fiber on the transmission side and effective coupling of the fiber output to a detector on the receiver side is often achieved through the use of small form factor optical transceivers or coupling elements that are often referred to as ports. Ports are also used for other purposes, such as coupling the output of an optical fiber to another optical fiber. Ports, which are often formed from ball lenses that are pressure fit to a housing body, are used because they are small and can typically be mass produced.

Optical transceivers or ports thus play an important role in optical networks. As the size of the optical ports decreases, attempts have been made to produce molded ports that incorporate the optical aspect or lens of the port into the molded design. This has proven to be a difficult task for several reasons. The molding process needs to support the integrity of the optical aspects of the port and the optical design of the port is typically limited by the mechanical limitations of the molding process.

In order to address these constraints, ports have been formed that assign optical power to each surface of the port lens. When the optical power of the port lens is divided between two surfaces, both making and designing the port become more difficult for several reasons. The surface accuracy of each surface, for instance, must be analyzed. Also, any positional error between the two surfaces of the port lens reduces the performance of the port lens due to aberrations that are caused by the positional error. In other words, it is more difficult to mold a port whose optical power is divided across two lens surfaces because there are more factors that can reduce the overall performance of the port.

Some optical transceivers incorporate ball lenses into their design. When the numerical aperture of the source light is low, a ball lens is usually able to couple the light effectively. Unfortunately, many light sources often generate most of the power into the higher angle light rays whose numerical aperture is higher than what the ball lens can effectively couple. The higher angle light rays are thus highly aberrated and are not effectively coupled by ball lenses, and ball lenses are unable to properly focus the higher angle light rays on an optical fiber or other light receiver.

Another problem with optical transceivers or ports is related to light reflections that interfere with the light source. When light rays from a light source are focused, for example, on an optical fiber, the image formed on the optical fiber is reflected back through the port lens to the light source. The reflection of light back into the light source may interfere with the data that is being transmitted over the optical network and may reduced the efficiency of both the light source and the lens. If the light source is an optical fiber, then the reflections may be transmitted back through the optical network.

BRIEF SUMMARY OF THE INVENTION

These and other problems and limitations are overcome by the present invention which relates to a small form factor optical transceiver or port. In one example of the present invention, a lens is integrated into the port such that the port or optical transceiver is a single molded optical element. The lens of the port has two surfaces: a focusing surface and a flat surface. The optical power of the lens is typically located in the focusing surface of the lens. This eliminates errors that are introduced when the optical power of a lens is divided between two surfaces and the surfaces are not positioned correctly with respect to each other.

The focusing surface of the lens is usually placed within the body of the port and supports correct magnification of the light source. The other lens surface is essentially flat and the space between the flat surface and the focusing surface is often filled with molding material. The flat surface is configured to be placed near the image position (on an optical fiber, for example) such that any tilt of the flat lens surface is minimized with respect to the image size.

The present invention may be used, for example, to couple multimode vertical cavity surface emitting lasers (VCSELs) with optical fibers. These VCSELs often produce power in the higher angle light rays that are emitted from the VCSEL and the lens of the port must be able to efficiently couple the high angle rays to the optical fiber in order to effectively couple the light. However, the image of the source light can be reflected back to the source and the reflection of the light source can interfere with the transmission of data in the optical network and is undesirable. The present invention introduces aberrations such that the image is defocused without sacrificing the ability of the port to effectively couple the light.

The present invention thus relates to a lens that has built in aberration without significantly impacting the ability of the lens to function as an optical transceiver. The lens, in accordance with the present invention, is thus able to couple a source with a receiver where the numerical aperture of the source is higher than the numerical aperture of the receiver. It is not necessary, however, that the numerical aperture of the receiver be lower than the numerical aperture of the light source.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5B illustrates the image or spot size of the points on an optical fiber of light points that are illustrated in FIG. 5A;

DETAILED DESCRIPTION OF THE PREFERRED EMBODIMENTS

As used herein, a "light source" or "source" refers to optical elements or devices that emit light or light signals. Exemplary optical elements include, but are not limited to, lasers (vertical cavity surface emitting lasers (VCSELs), edge emitting lasers, and the like), ports, optical fibers, other optical transceivers and the like or any combination thereof. As used herein, a "light receiver" or "receiver" refers to optical elements that receive light or that are coupled to light sources. Exemplary receivers include, but are not limited to, ports, optical fibers, detectors, lenses, other optical transceivers and the like or any combination thereof. A light source is often coupled to a receiver using an optical transceiver or port that, in accordance with the present invention, incorporates a lens. This includes, but is not limited to, using a port or lens to couple a laser light source to an optical fiber, couple the output of one optical fiber to the input of another optical fiber, couple the output of an optical fiber to a detector, and the like or any combination thereof.

Optical transceivers typically use ball lenses to couple light from a source, such as a VCSEL, to a receiver such as an optical fiber. As previously described, however, ball lenses are unable to efficiently couple light in some instances because most of the power emitted by the VCSEL is located in the high angle rays that are emitted from the VCSEL that the ball lens cannot properly focus on the receiver. The present invention relates to an optical transceiver or port that includes or incorporates a lens that is able to couple high angle rays from a source to a receiver. The present invention also introduces designed aberrations such that the image is slightly defocused in order to reduce or eliminate reflections back into the source while still coupling the source to the receiver.

Figure 1:
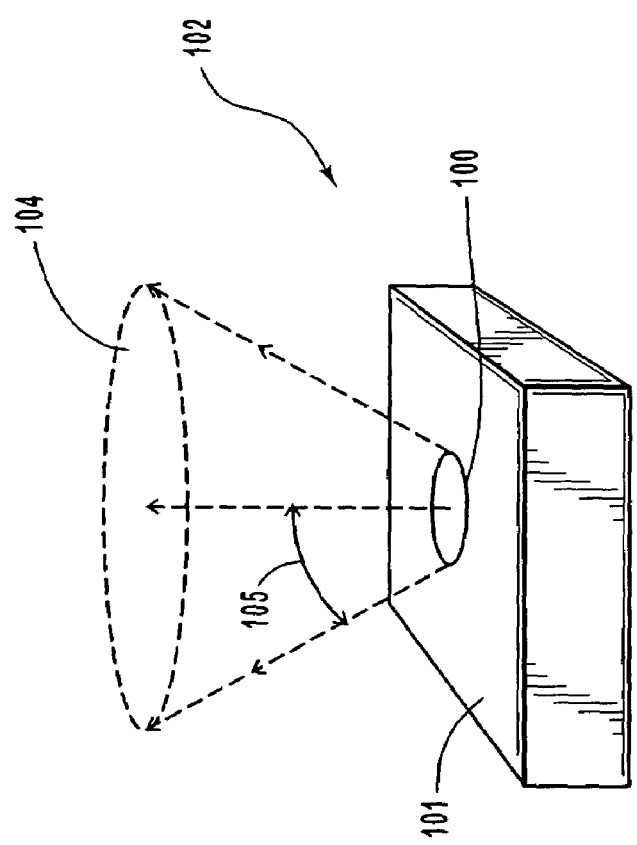
FIG. 1 is a perspective illustration of a vertical cavity surface emitting laser and illustrates the numerical aperture of the high angle light rays that are emitted from the surface of the vertical cavity surface emitting laser.

FIG. 1 is a block diagram that illustrates a VCSEL, which is one example of a multi mode light source. It is understood that the present invention is not limited to VCSELs as light sources and that other light sources, such as edge emitting lasers can be used. Although the operation of a VCSEL and other light sources is known in the art, the operation of a VCSEL is presented for clarity. In a VCSEL 100, the laser light 104 emerges from a surface 101 of the VCSEL 100. The light 104 is emitted at various angles that is often dependent on the current that is applied to the VCSEL 100. Accordingly, some of the rays emitted by the VCSEL 100 have more power than other rays emitted by the VCSEL 100. The angle 105 corresponds to the numerical aperture of the VCSEL 100. The numerical aperture can thus be used to identify the angles of the light rays that have the most power. When the power of the light is carried in the high angle rays, it is necessary to effectively couple the high angle rays to the receiver.

Figure 2:
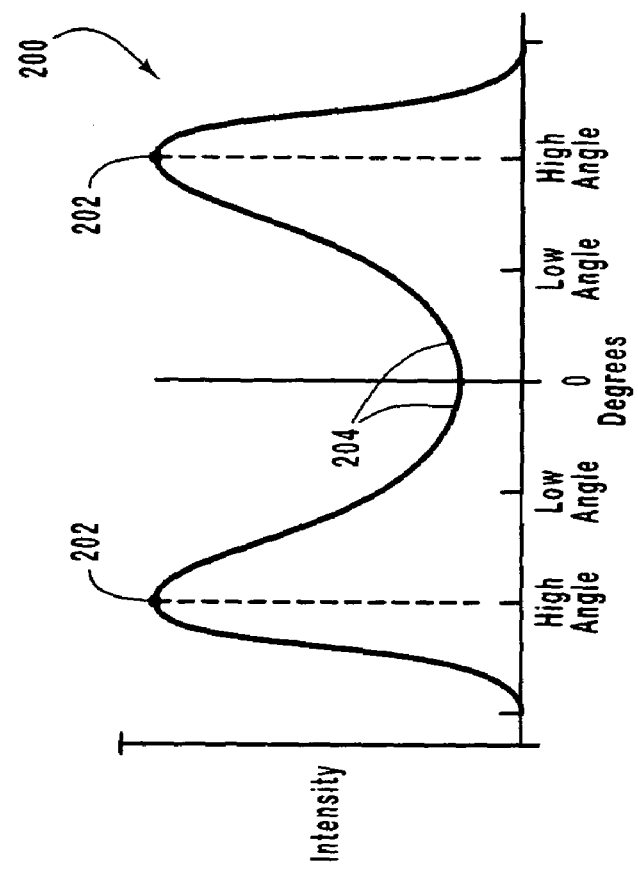
FIG. 2 is a plot that correlates the angle of a light ray with the intensity of the light ray and illustrates that the most intense light rays are the high angle light rays.

FIG. 2 further explains the relationship between the power contained in the rays emitted by the VCSEL 100 and the angle at which the rays are emitted from the VCSEL 100. FIG. 2 illustrates the far field effect of a VCSEL, and a graph 200 plots the degrees with which rays leave the VCSEL against the relative intensity of those rays. In this example, the point 204 has lower intensity that the point 202. The rays that correspond to the point 204 are low angle rays while the rays that correspond to the point 202 are high angle rays. In other words, the numerical aperture of the rays represented by the point 202 is greater than the numerical aperture of the rays represented by the point 204. Extending the graph to three dimensions, the far field plot of the VCSEL 100 thus has a doughnut shape and the power is concentrated in the larger or higher angle rays emitted from the VCSEL 100. Efficiently coupling a VCSEL or other light source that has a similar far field pattern requires that the higher angles be coupled to the fiber. An optical element such as a lens that is incorporated into a port should be able to couple the high angle rays of the light source in order to achieve efficient coupling of the source to the receiver.

Figure 3:
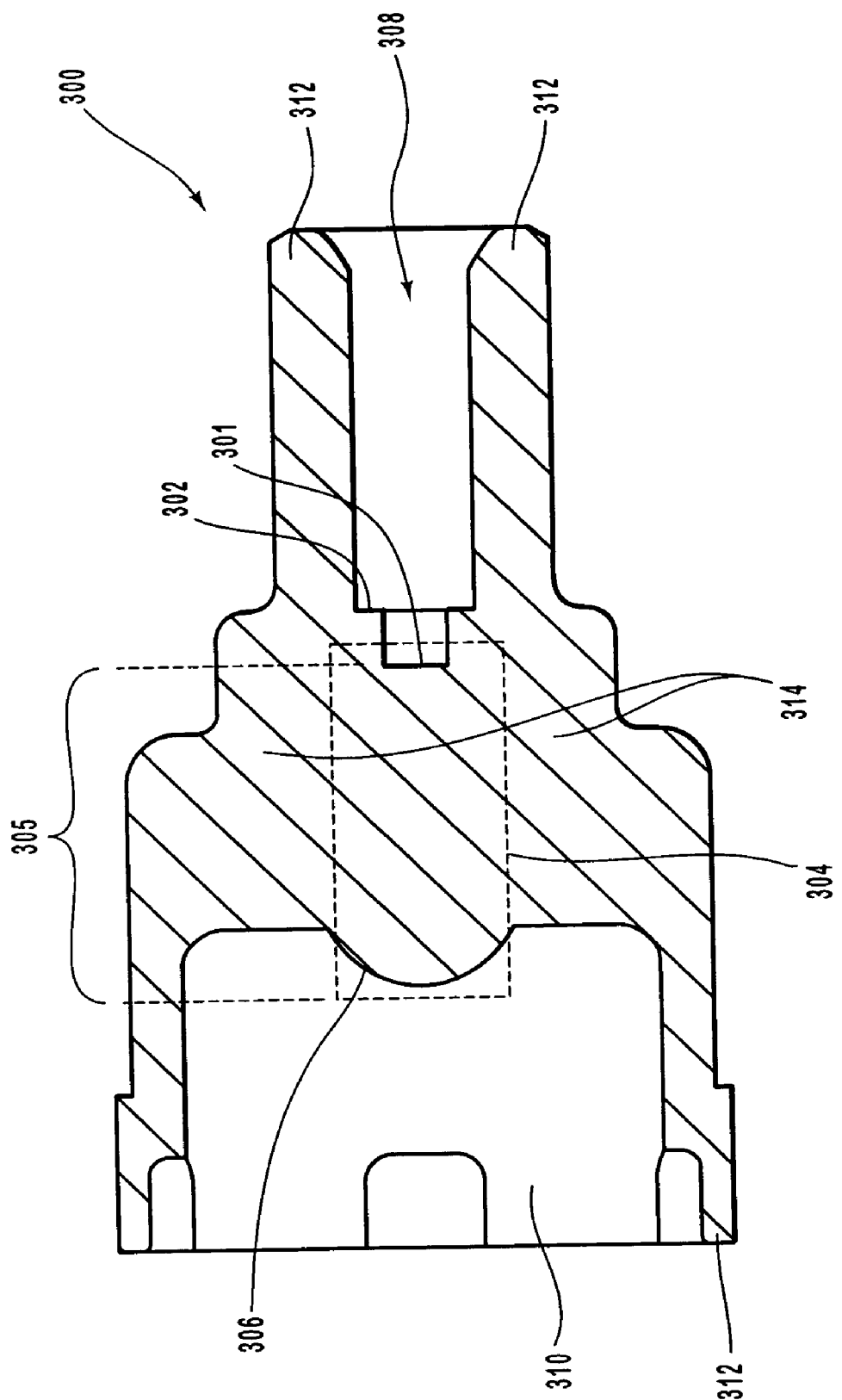
FIG. 3 is a cross sectional view of an optical transceiver or port that incorporates a lens.

FIG. 3 illustrates an optical transceiver or port in accordance with the present invention and more particularly illustrates a cross sectional view of an exemplary small form factor optical transceiver or port. The port 300 is molded from plastic or other suitable material and incorporates a lens 304, as indicated by the dashed box, as an integral part of the molded port 300. The lens 304 of the port 100 includes a lens surface 306 and the lens 304 has a thickness 305. The lens 304 is embedded inside of the lens access 310 of the port 300. The lens surface 306 is the surface of the lens 304 that has optical power. The lens surface 301 is typically flat and does not have optical power.

Because the optical power of the lens is concentrated in a single lens surface, the design tolerances with which the lens should comply are reduced. If the lens 304 of the port 300 has optical power in both the lens surface 304 and the lens surface 301, then it is necessary to make each lens surface comply with design tolerances. In addition, it is necessary, in this situation where each lens surface has optical power, to ensure that the mechanical position of the lenses is within tolerances in all translation and tilt axes with respect to each other. If the lens surfaces were to have positional errors, the performance of the lens 304 is reduced. By making the lens surface 301 substantially flat, these potential problems are reduced or eliminated. The flat surface 301 therefore does not have cross positional tolerances, with respect to the port or optical axis, because it has no optical power. If the flat surface 301 does include errors along the optical axis, which is typically normal to the flat surface 301, then compensation for this error can be made by slightly defocusing the source without incurring significant aberrations.

The port 300 is used to couple a source to a receiver. For example, the port 300 may be used to couple a light source such as a VCSEL with a receiver such as an optical fiber. Using this example, the port 300 can be connected or coupled with an optical fiber using the fiber access 308 which is formed by the fiber guide 312. The optical fiber is inserted into the fiber access 308. A fiber stop 302 is included in the port 300 to ensure that the fiber is not inserted in the port 300 too far and to properly position the fiber with respect to the flat surface 301 of the lens 304. The fiber guide 312 thus surrounds a portion of the optical fiber. It is understood that the port 300 can have other mechanical configurations that permit the port to be connected with the light source and the receiver. In each case, the flat surface 301 is properly positioned with respect to the optical fiber.

The lens surface 306 is typically located within the port access 310, which is formed by source guide 312. The source guide 312 is typically configured to connect with a source such that the source is appropriately placed near the lens 304. The area between the focusing lens surface 306 and the flat lens surface 301 is typically filled with molding material. The area 314 is also filled with molding material to enhance the mechanical stability of the lens without much absorption and scattering penalty.

Figure 4:
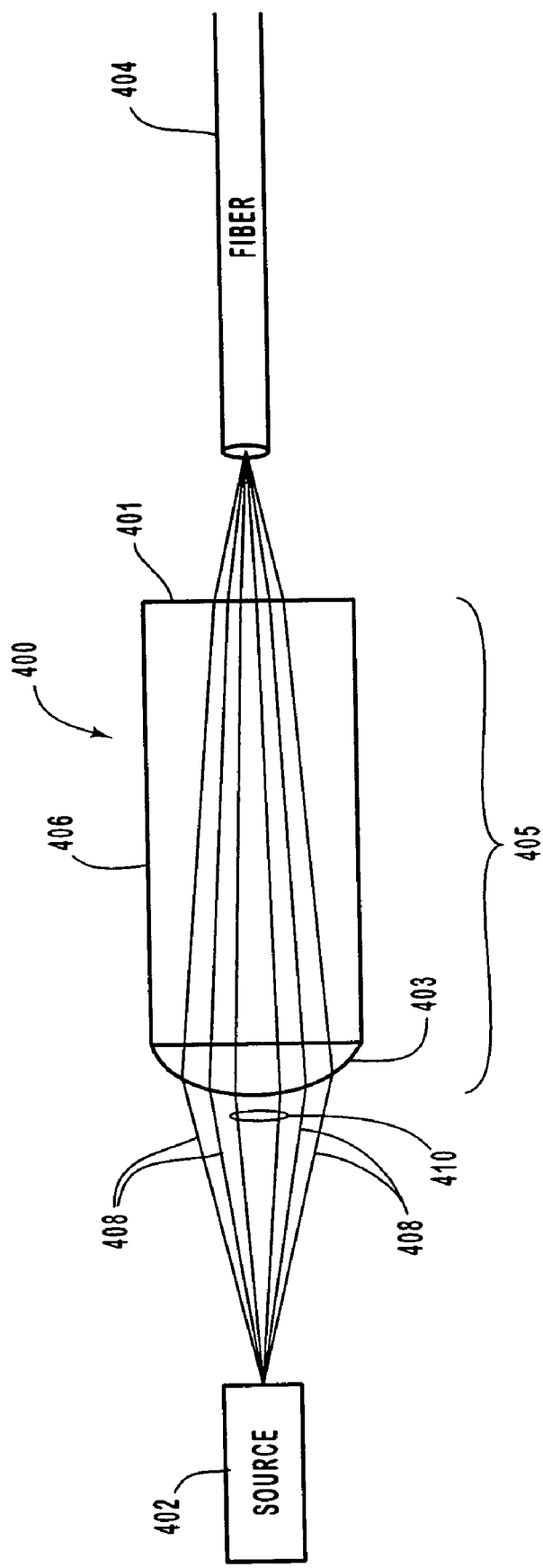
FIG. 4 illustrates a source whose high angle rays are coupled to an optical fiber using a lens that has optical power in a single lens surface.

FIG. 4 is a block diagram that illustrates an example of a lens 400 that may be formed as an integral part of the port 300 illustrated in FIG. 3. The lens 400 includes a body 406. A flat lens surface 401 without optical power is formed at one end of the body 406 of the lens 400 while the focusing lens surface 403 of the lens 400 is curved and has optical power. A source 402, which may be a VCSEL, is illustrated in FIG. 4 and the light emitted by the source 402 is being coupled to an optical fiber 404 by the lens 400. It is understood that FIG. 4 is illustrative in nature and is not drawn to scale.

The light source 402 emits rays of light and the rays 408 are high angle rays and typically carry more power than the low angle rays 410 as described in FIGS. 1 and 2. In order to efficiently couple the source 402 to the fiber 404, the high angle rays must be properly directed or focused on the fiber 404. The length 405 of the lens 400 is related to the magnification of the lens 400 and the lens surface 403 is an example of focusing means for focusing light from a source onto a receiver.

The fiber 404 has a numerical aperture that determines which light rays are accepted into and transmitted by the fiber 404. Rays that are incident to the fiber 404 at too steep of an angle, which is greater that the numerical aperture of the fiber 404, are lost. In this example, the rays 408 are within the numerical aperture of the fiber 404 and are effectively coupled. The lens 400, using the lens surface 403 and a magnification of 1.5 can couple, for example, a 0.3 numerical aperture source to a 0.2 numerical aperture receiver.

Figure 6:
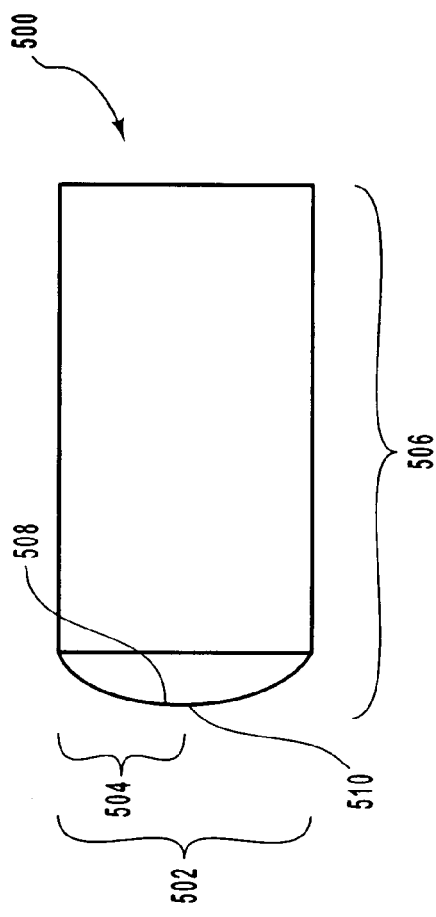
FIG. 6 illustrates a lens.
Figure 6:
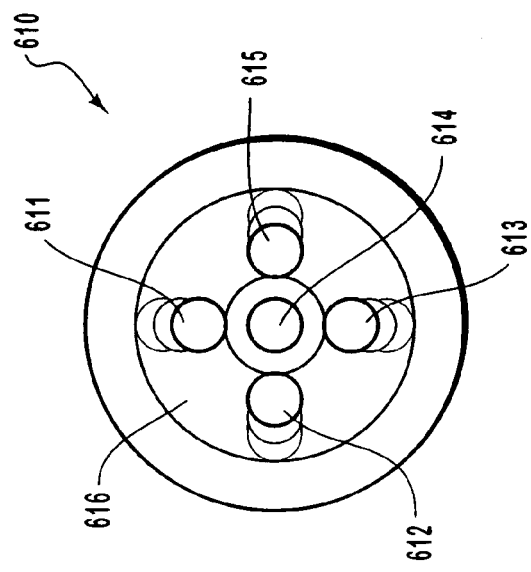

FIG. 6 illustrates features of a lens that may be incorporated into a port. This illustration is intended as exemplary and the present invention is not limited to this example. The lens 500 has a diameter 502 of 2 millimeters and a clear aperture of 1.6 millimeters. The lens thickness 506 is 3.41 millimeters +/−0.01 millimeter. The surface accuracy of the focusing lens surface 510 has less than 0.3 micron sag error over the clear aperture of the lens and less than 0.2 micron local surface errors. The lens surface should not have visible scratches, digs, or bubbles under a 20× microscope. The centricity of the lens is +/−25 microns and the tilt is +/−1 degree.

Figure 5A:
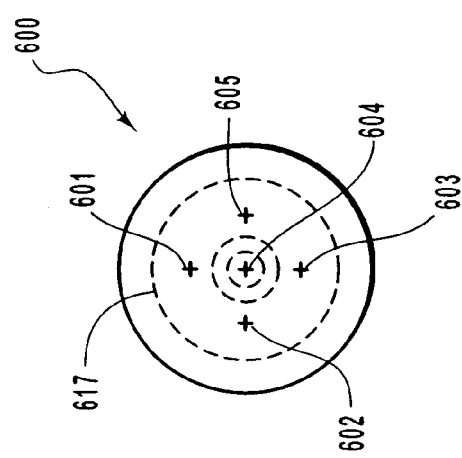
FIG. 5A illustrates points of light from a light source.

These tolerances are exemplary in nature and help ensure that the lens is capable of effectively coupling a light source to a receiver. A significant advantage of this lens, as is illustrated in FIGS. 5A and 5B below, is that reflections of the image back to the source are reduced or eliminated because the lens introduces aberrations without sacrificing the ability of the lens to effectively couple light. The present invention is, therefore, not limited to these tolerances or to this specific design, but extends to all lens or ports that reduce reflections back to the light source.

For this example of the focusing lens surface, c=1.4265 and k=−1.292. The following table is a sag table that defines the lens surface. All numbers are in millimeters. The y coordinate is 0 at the center of the lens.

| Y Coordinate | SAG |
|---|---|
| 0.000000e+000 | 0.000000e+000 |
| 5.000000e−002 | 1.782537e−003 |
| 1.000000e−001 | 7.122236e−003 |
| 1.500000e−001 | 1.599554e−002 |
| 2.000000e−001 | 2.836375e−002 |
| 2.500000e−001 | 4.417388e−002 |
| 3.000000e−001 | 6.335972e−002 |
| 3.500000e−001 | 8.584321e−002 |
| 4.000000e−001 | 1.115359e−001 |
| 4.500000e−001 | 1.403404e−001 |
| 5.000000e−001 | 1.721525e−001 |
| 5.500000e−001 | 2.068620e−001 |
| 6.000000e−001 | 2.443550e−001 |
| 6.500000e−001 | 2.845151e−001 |
| 7.000000e−001 | 3.272244e−001 |
| 7.500000e−001 | 3.723653e−001 |
| 8.000000e−001 | 4.198212e−001 |

FIGS. 5A and 5B illustrate how the lens described above focuses a source on a fiber. FIG. 5A represents the light source and FIG. 5B illustrates the image of the source on the receiver or optical fiber. In this example, the points 601, 602, 603, 604, and 605 are selected at the source 600. If the lens focuses these source points on the receiver, then the image would be points as well. The lens described herein, however, introduces aberrations or slightly defocuses the points 601–605. The image is represented on the receiver 610 as images 611, 612, 613, 614, and 615. The image 611 is from the point 601, the image 612 is from the point 602, the image 613 is from the point 603, the image 614 is from the point 604, and the image 615 is from the point 605. The images 611, 612, 613, 614, and 615 are aberrated or slightly defocused. However, the aberrated images are within and envelope 616 that permits effective coupling with the optical fiber. The aberrated images have good containment and are sufficiently far away from the edges of the fiber.

By introducing these aberrations into the lens, the lens or the port is still able to effectively couple the source to the receiver, but reflections from the image back to the source are reduced or eliminated. The spots or the images formed on the receiver are affected, for instance, by the magnification of the lens and by the aberration introduced by the lens.

In other words, the images of the selected points are spots. In this example where the optical fiber has a diameter of approximately 60 microns, the spots have a diameter of approximately 10 microns. The high angle rays are coupled by the port and reflection of the to image back to the source is reduced or eliminated by the aberrations introduced by the lens of the port.

Figure 7:
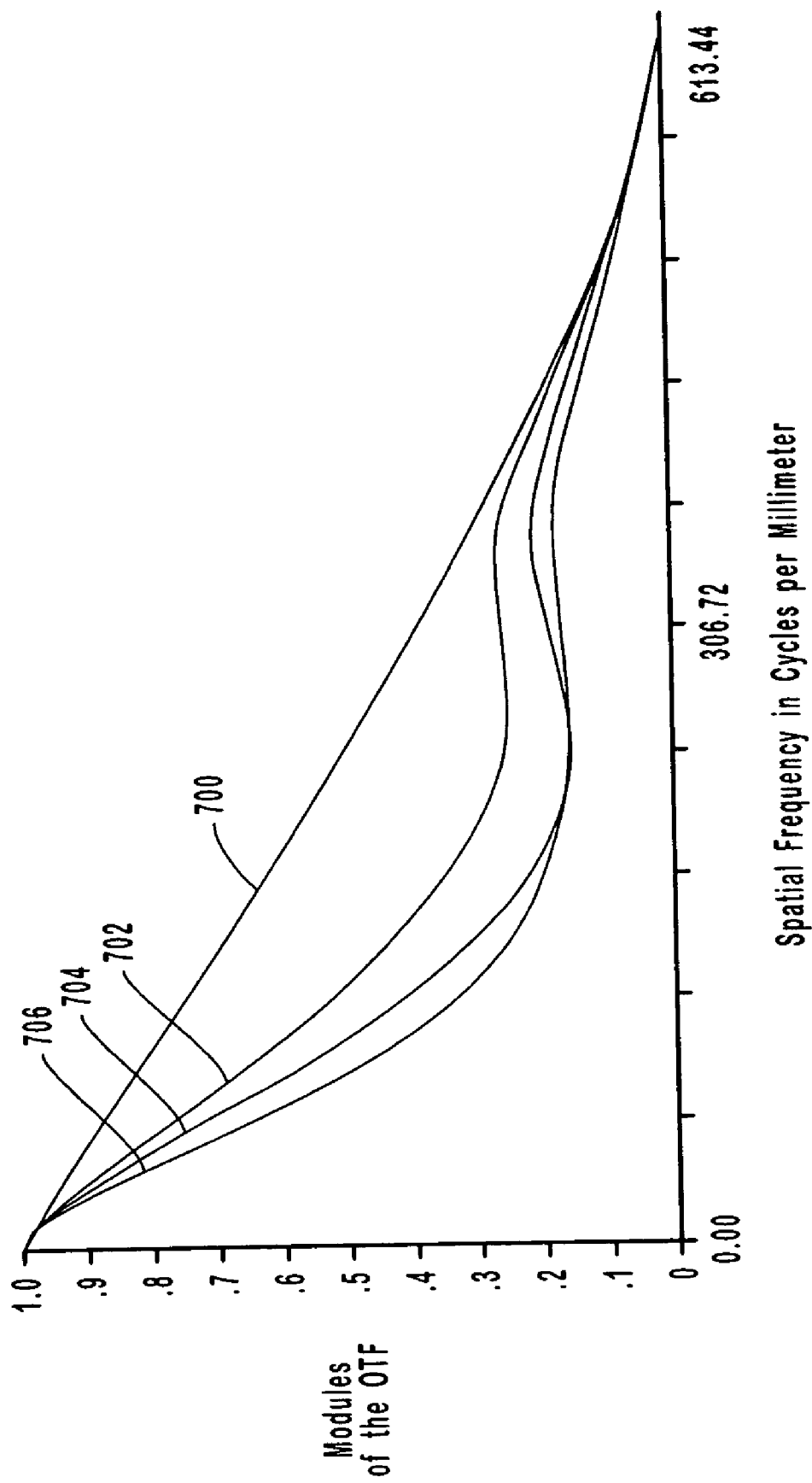
FIG. 7 plots the ability of a lens to couple light.

FIG. 7 illustrates a transform function of the lens described herein. The line 700 illustrates the transfer function in terms of spatial frequency in cycles per millimeter at a diffraction limit with no aberration. The lines 702, 704, and 706 illustrate the transfer function with various aberrations. FIG. 7 illustrates how the information is translated with respect to frequency. The aberrations introduced by the lens reduces feedback while permitting the laser light to be coupled.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical communication system, an optical transceiver for coupling light from a source optical element to a receiving optical element, the optical transceiver comprising:
    a body including a source guide that connects the optical transceiver with the source optical element and a fiber guide that connects the optical transceiver with the receiving optical element; and
    a lens formed as a molded part of the body and that focuses light from the source optical element on a surface of the receiving optical element, wherein the lens aberrates light from the source optical element on the receiving optical element within an envelope defined on the receiving optical element to permit coupling of the aberrated light with the receiving optical element while reducing feedback reflected back to the source optical element, the lens comprising:
        a focusing lens surface that is positioned within a source guide such that far field radiation emitted by the source optical element is directed to the receiving optical element, the focusing lens surface having a curvature that introduces aberrations into the light focused on the receiving optical element; and
        a flat lens surface positioned within the fiber guide, wherein the flat lens surface does not have optical power.

2. An optical transceiver as defined in claim 1, wherein the body further comprises a fiber stop located within the fiber guide, wherein the fiber stop positions the receiving optical element with respect to the flat lens surface.

3. An optical transceiver as defined in claim 1, wherein the lens further comprises a length that determines a magnification of the lens.

4. An optical transceiver as defined in claim 1, wherein the focusing lens surface comprises a clear aperture.

5. An optical transceiver as defined in claim 1, wherein the focusing lens surface couples high angle rays from the source optical element on the receiving optical element, wherein an image formed by the lens on the receiving optical element is aberrated.

6. In an optical communication system where optical signals are coupled from one optical element to another optical element, a port for coupling a source optical element with a receiving optical element, the port comprising:
    a port body including a source guide and a fiber guide, wherein the source guide is formed to connect with the source optical element and wherein the fiber guide is formed to connect with the receiving optical element; and
    a lens formed as an integral part of the port body, wherein the lens receives light generated by the source optical element and focuses the light on the receiving optical element such that the light is aberrated at the receiving optical element to reduce feedback, wherein the lens comprises:
        a focusing lens surface, wherein the focusing lens surface has a curvature that introduces aberrations in the light being coupled with the receiving optical element such that the light on the receiving optical device is aberrated at the surface of the receiving optical element within a containment envelope defined on the surface of the receiving optical element, wherein the containment envelope has a diameter that is less than diameter of a fiber in the receiving optical element; and
        a flat lens surface.

7. A port as defined in claim 6, wherein the focusing lens surface has a clear aperture.

8. A port as defined in claim 6, wherein the lens has a length to magnify the light being coupled.

9. A port as defined in claim 6, wherein the focusing lens surface couples high angle rays from the source optical element on the receiving optical element, wherein an image formed by the lens on the receiving optical element is aberrated.

10. A port as defined in claim 6, wherein a point light source from the source optical element is imaged as a spot on the receiving optical element.

11. A port as defined in claim 6, wherein the port further comprises a fiber stop formed within the fiber guide, wherein the fiber stop positions the receiving optical element near the flat lens surface.

12. A lens disposed with a molded port for coupling a source optical element with a receiving optical element, the lens comprising:
    focusing means for aberrating light from the source optical element such that an image of the source optical element focused on the receiving optical element is aberrated without exceeding a containment envelope defined on the receiving optical element to reduce reflections back into the source optical element;
    a flat lens surface that does not have optical power, wherein the flat lens surface is positioned near the receiving optical element such that a tilt of the flat lens surface does not affect the coupling of light between the source optical element and the receiving optical element; and
    a length that determines a magnification of the lens and a position of the source optical element with respect to the receiving optical element.

13. A lens as defined in claim 12, wherein the focusing means further comprises a focusing lens surface.

14. A lens as defined in claim 13, wherein the lens further comprises a clear aperture defined by a sag table.

15. A lens as defined in claim 13, wherein the tolerance of the sag table is less than 0.1 microns.

16. A lens as defined in claim 13, wherein a point from the source optical element is imaged as a spot on the receiving optical element, wherein the spot has a diameter on the order of 10 microns.

* * * * *

UNITED STATES PATENT AND TRADEMARK OFFICE
CERTIFICATE OF CORRECTION

PATENT NO. : 7,083,337 B2  Page 1 of 1
APPLICATION NO. : 10/695129
DATED : August 1, 2006
INVENTOR(S) : Farr et al.

It is certified that error appears in the above-identified patent and that said Letters Patent is hereby corrected as shown below:

IN THE SPECIFICATIONS:

<u>Column 4</u>
Line 28, change "point 204 has" to --points 204 have--
Line 28, before "202", change "point" to --points--
Line 29, before "204", change "point" to --points--
Line 30, before "202", change "point" to --points--
Line 32, before "202", change "point" to --points--
Line 33, before "204", change "point" to --points--
Line 49, change "100" to --300--

Signed and Sealed this

Second Day of November, 2010

David J. Kappos
*Director of the United States Patent and Trademark Office*